United States Patent
Curran

Patent Number: 5,828,306
Date of Patent: Oct. 27, 1998

[54] LOCATION DETECTOR AND MONITOR AND METHOD OF USING THE SAME

[76] Inventor: Brendan Joseph Curran, 57-69 73rd Pl., Maspeth, N.Y. 11378

[21] Appl. No.: 631,923

[22] Filed: Apr. 15, 1996

[51] Int. Cl.$^6$ .................................................. G08B 23/00
[52] U.S. Cl. .......................... 340/573; 340/539; 340/571; 340/825.49; 340/825.36; 340/988; 342/126; 342/146
[58] Field of Search ..................................... 340/573, 539, 340/571, 572, 825.49, 825.36, 988; 342/126, 146

[56] References Cited

U.S. PATENT DOCUMENTS

| | | | |
|---|---|---|---|
| 4,528,566 | 7/1985 | Tyler | 342/419 |
| 4,593,273 | 6/1986 | Narcisse | 340/539 |
| 4,598,272 | 7/1986 | Cox | 340/539 |
| 4,692,742 | 9/1987 | Ralzen et al. | 340/539 |
| 4,706,689 | 11/1987 | Man | 128/903 |
| 4,777,478 | 10/1988 | Hirsch et al. | 340/573 |
| 4,952,928 | 8/1990 | Carroll et al. | 340/825.54 |
| 5,115,223 | 5/1992 | Moody | 340/573 |
| 5,119,072 | 6/1992 | Hemingway | 340/573 |
| 5,245,314 | 9/1993 | Kah, Jr. | 340/539 |
| 5,289,163 | 2/1994 | Perez et al. | 340/539 |
| 5,357,254 | 10/1994 | Kah, Jr. | 342/42 |
| 5,396,224 | 3/1995 | Dukes et al. | 340/825.49 |
| 5,448,221 | 9/1995 | Weller | 340/539 |
| 5,461,365 | 10/1995 | Schlager et al. | 340/573 |
| 5,461,390 | 10/1995 | Hoshen | 342/419 |
| 5,497,149 | 3/1996 | Fast | 340/988 |
| 5,512,879 | 4/1996 | Stokes | 340/573 |
| 5,537,102 | 7/1996 | Pinnow | 340/825.3 |
| 5,552,772 | 9/1996 | Janky et al. | 340/573 |
| 5,568,119 | 10/1996 | Schipper et al. | 340/825.37 |
| 5,596,313 | 1/1997 | Berglund et al. | 340/574 |

*Primary Examiner*—Jeffery Hofsass
*Assistant Examiner*—Benjamin C. Lee
*Attorney, Agent, or Firm*—Michael I. Kroll

[57] ABSTRACT

A location detector and monitor removably attached to a person utilizing a stationary monitoring computer, a satellite, and three spaced signal dishes. The satellite sends out, in response to the monitoring computer sending out a signal, a microwave signal received by the three dishes linked by telephone line to the monitoring computer. The latter plots the location of the person by the use of cartesian coordinates from the information provided by the three dishes.

8 Claims, 10 Drawing Sheets

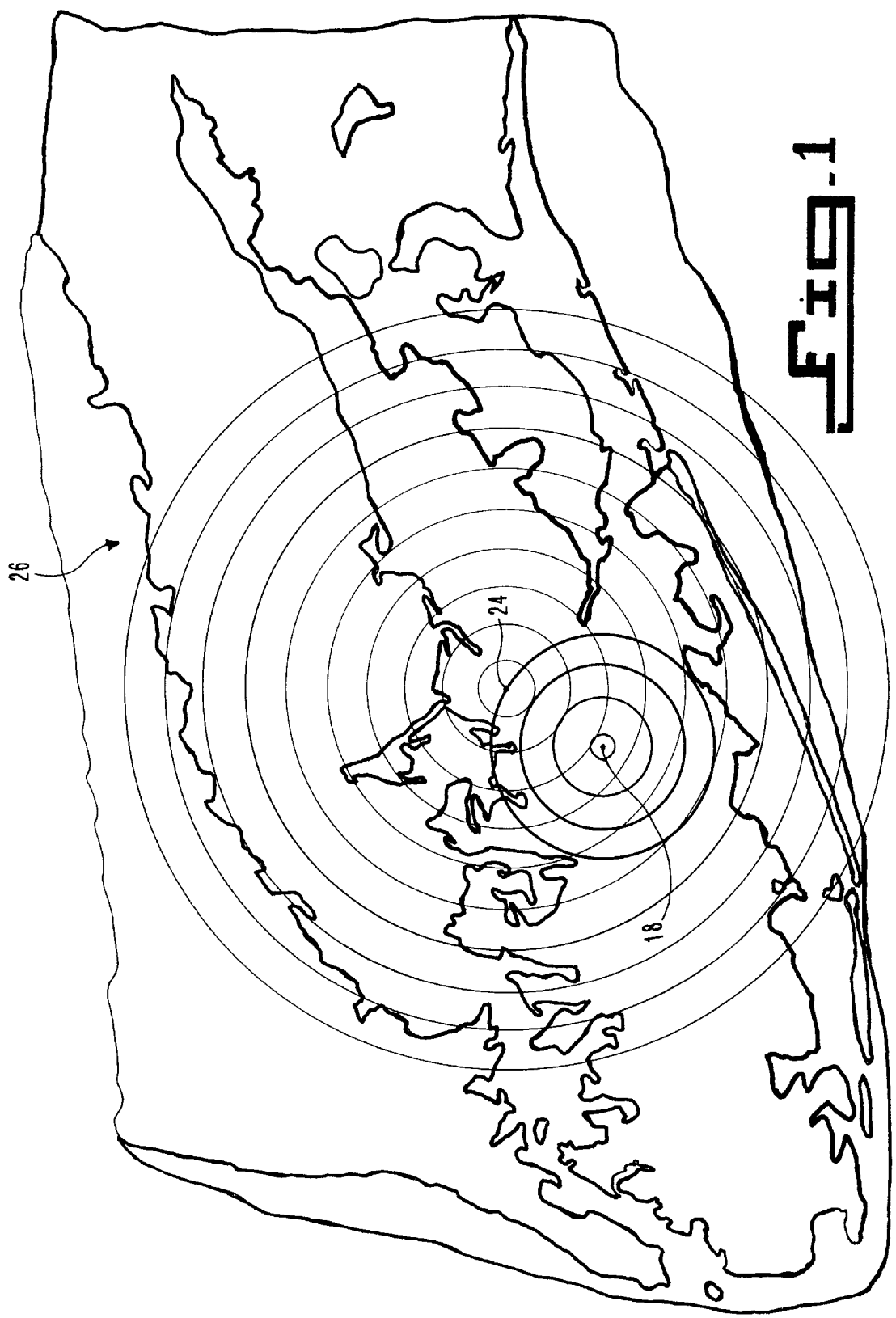

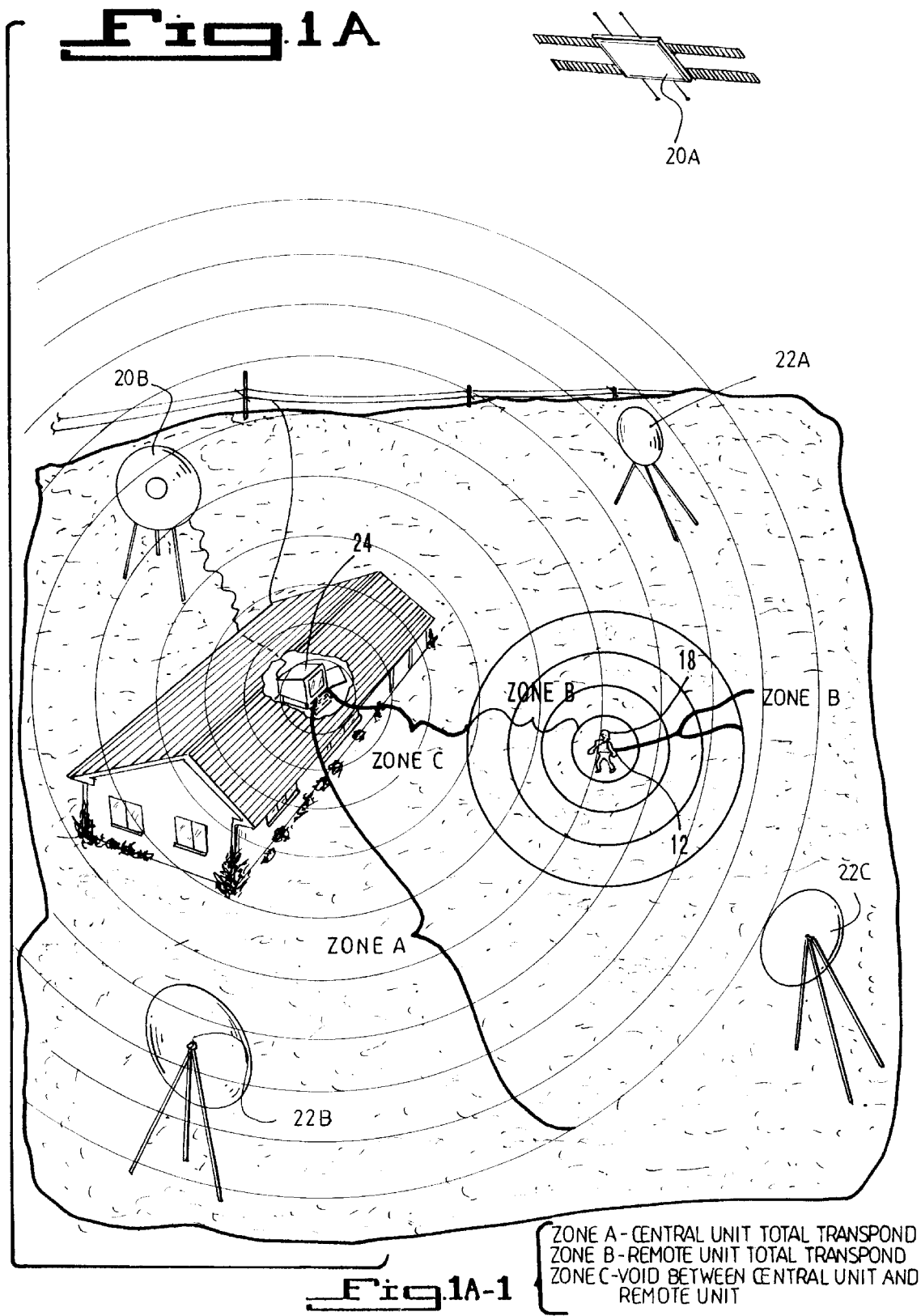

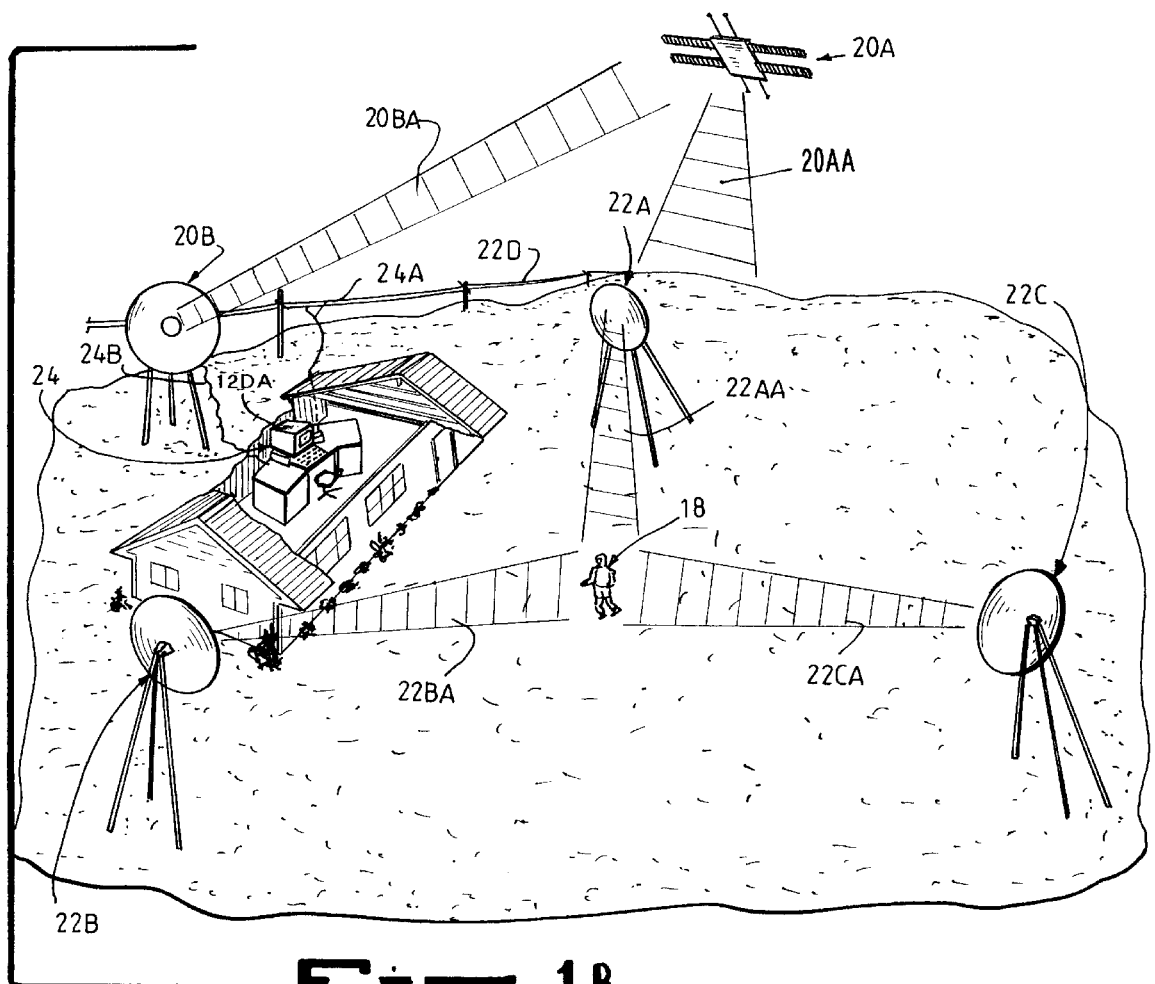
Fig. 1B
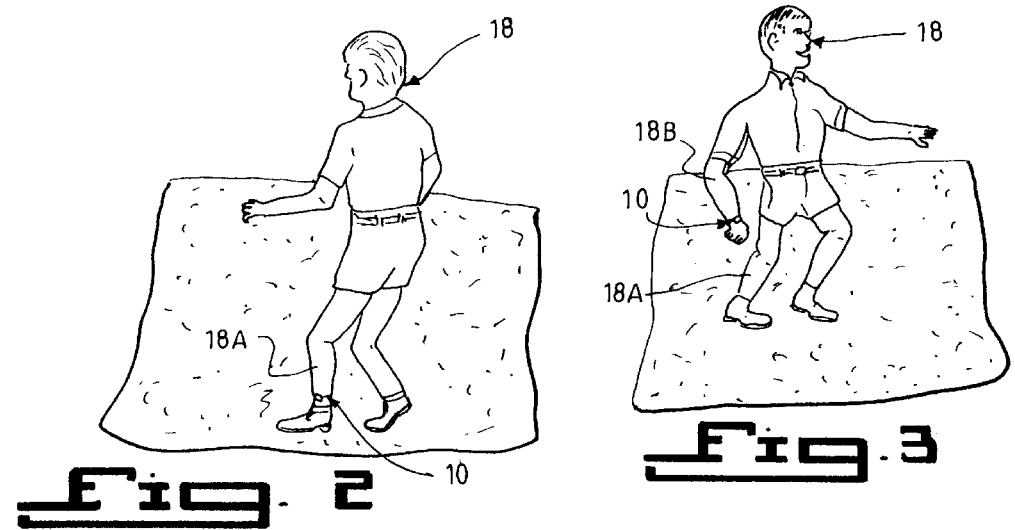
Fig. 2
Fig. 3

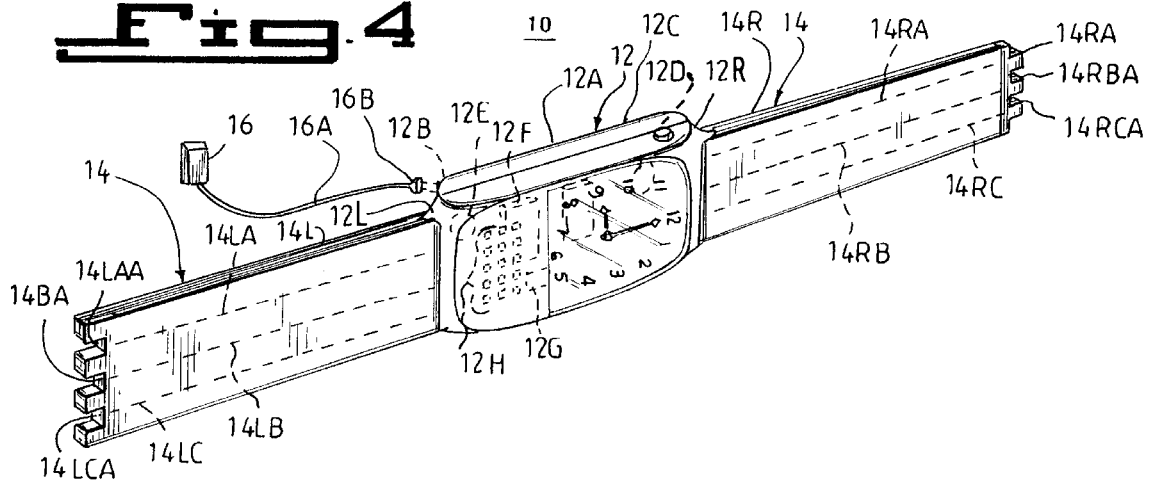
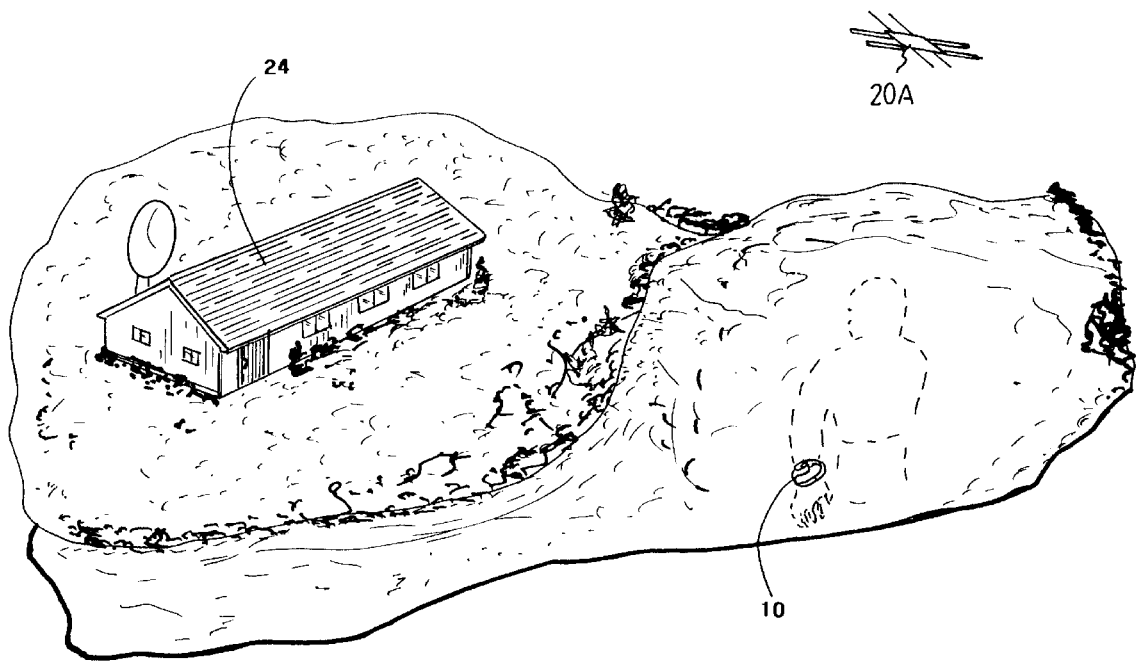

LOCATION DETECTOR AND MONITOR AND METHOD OF USING THE SAME

BACKGROUND OF THE INVENTION

1. Field of the Invention

The present invention relates to location and monitoring devices. More particularly, the present invention relates to location and monitoring devices which are compact and can be worn by a user on a wrist utilizing tri-vector antenna and/or satellite communication system.

2. Description of the Prior Art

Devices have been developed for monitoring the location persons with mental such as the elderly with Alzheimer Disease or children to prevent abduction. The patented inventions fall into two major categories. The first category is devices that only transmit a signal between the monitoring and monitored units when an individual activates the device. These types of devices are limited in their uses. The second category of device are those that transmit a continuous signal between the monitoring and monitored units. If the units are separated beyond a preset distance the alarm is activated and location of the person is positioned using Cartesian Coordinates in conjunction with tri-vector antennas and/or satellites. The above mentioned devices have be unable to provide an efficient method for locating the monitored individual or the like once an alarm condition has surfaced.

Numerous innovations for location and monitoring devices have been provided in the prior art that are described as follows. Even though these innovations may be suitable for the specific individual purposes to which they address, they differ from the present invention as hereinafter contrasted.

In U.S. Pat. No. 4,528,566 titled Transmitter and Receiver Locating Device invented by Tyler discloses a directional locating device which transmits pulsed RF signals at a stabilized frequency and is carried by an object the direction of which is to be determined from a distance remote from the transmitter. A one half wave delay line in the receiver is responsive to the signal detected by a directional antenna for generating a 180 degree out of phase signal with respect to the signal detected by a sense antenna.

The above described patented invention differs from the present invention because the patented invention lacks a remote unit housing (12A) having a remote unit keypad (12H), a strap receiver antenna, a safety strap, a strap transmitter antenna, a remote unit speaker/microphone (12D) as well as lacking both satellite (20A) and signal dishes (22A, 22B, 22C) with associated communications integrated with a central monitoring computer (24).

In U.S. Pat. No. 4,692,742 titled Security System with Correlated Signaling to Selected Satellite Stations invented by Raizen et al discloses a security system wherein a plurality of locations are monitored by sensors which transmit alarm signals to a central control station by radio or telephone, each alarm signal being encoded to identify the particular sensor location and alarm condition. The control station comprises a computer which correlates the received alarm signals with information stored in the computer memory to identify which of a plurality of satellite stations are to be notified of a particular alarm condition at a particular monitored location, what correlated information is to be transmitted to such satellite station and whether to effect such transmission by radio or telephone.

The above described patented invention differs from the present invention because the patented invention lacks a remote unit (12) as well as lacking signal dishes (22A, 22B, 22C) with associated communications integrated with a central monitoring computer (24).

In U.S. Pat. No. 4,777,478 titled Apparatus for Monitoring Persons or the Like invented by Hirsch et al discloses an apparatus for monitoring persons, pets, things, and the like including a monitored unit each having a transmitter and receiver. The monitored unit is adapted to transmit a periodic signal while the activities of the monitored object coincide with various threshold conditions. The monitored unit includes a plurality of indicators either visual or audio which inform the operator that the monitored unit has exceeded various threshold conditions. The monitoring unit includes a reset transmitter for actuating the monitored unit so that it produces either a continuous signal or a periodic signal.

The above described patented invention differs from the present invention because the patented invention lacks a remote unit housing (12A) having a remote unit keypad (12H), a strap receiver antenna, a safety strap, a strap transmitter antenna, a remote unit speaker/microphone (12D) as well as lacking both satellite (20A) and signal dishes (22A, 22B, 22C) with associated communications integrated with a central monitoring computer (24).

In U.S. Pat. No. 5,119,072 titled Apparatus for Monitoring Child Activity invented by Hemingway discloses an apparatus for monitoring a child or the like which includes a transmitter having a microphone and an oscillator coupled to an antenna within an enclosure for mounting on a child's arm and transmitting a frequency modulated RF signal from the antenna. A separate receiver, within an enclosure, constructed to be hand carried by a parent, includes circuitry for separating the audio and carrier components of the signal received at the receiver, and comparing field strength of the carrier component to a range threshold. When the amplitude of the carrier filed strength is less than the threshold value, an alarm is sounded to indicate that the child is out of desired range. The audio component is fed to a speaker so that the parent can monitor the activities of the child.

The above described patented invention differs from the present invention because the patented invention lacks a remote unit housing (12A) having a remote unit keypad (12H), a strap receiver antenna, a safety strap, a strap transmitter antenna as well as lacking both satellite (20A) and signal dishes (22A, 22B, 22C) with associated communications integrated with a central monitoring computer (24).

In U.S. Pat. No. 5,245,314 titled Location Monitoring System invented by Kah, Jr. discloses a location monitoring system having a radio frequency transmitter for a person or object and radio frequency receiver for someone to monitor movement of said person or object and radio frequency receiver for someone to monitor movement of said person or object, said receiver sounding an alarm at a predetermined time after failure to receive a signal. The transmitter is made having an intermittent transmitted signal and the receiver is made having an off timer to coordinate with said intermittent signal, said off times saving battery power. The radio frequency receiver has an electronic switching means controlled by said radio frequency transmitter for sounding an alarm. An antenna is located in part of the carrying strap of said transmitter.

The above described patented invention differs from the present invention because the patented invention lacks a remote unit housing (12A) having a remote unit keypad (12H), a strap receiver antenna, a safety strap, a strap transmitter antenna, a remote unit speaker/microphone (12D) as well as lacking both satellite (20A) and signal dishes (22A, 22B, 22C) with associated communications integrated with a central monitoring computer (24).

In U.S. Pat. No. 5,289,163 titled Child Position Monitoring and Locating Device invented by Perez et al discloses a monitoring device that monitors the position of a child by detecting the signal strength of a radio frequency carrier from a transmitter attached to the child. If the signal of the radio frequency carrier is too weak, the child is too far away from the adult with the child monitoring device. When this happens, the adult is informed that the child has wandered too far away through the use of an audio tone or through the use of vibrations coming from the device. Once the adult is notified that the child is too far away, the device also has a locating display for indicating the relative direction of the child with respect to the adult.

The above described patented invention differs from the present invention because the patented invention lacks a remote unit housing (12A) having a remote unit keypad (12H), a strap receiver antenna, a safety strap, a strap transmitter antenna, a remote unit speaker/microphone (12D) as well as lacking both satellite (20A) and signal dishes (22A, 22B, 22C) with associated communications integrated with a central monitoring computer (24).

Numerous innovations for location and monitoring devices have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to location and monitoring devices. More particularly, the present invention relates to location and monitoring devices which are compact and can be worn by a user on a wrist utilizing tri-vector antenna and/or satellite communication system.

The types of problems encountered in the prior art are accurately positioning a person when he/she travels beyond the communication range preset in accord with the transmitter and receiver.

In the prior art, unsuccessful attempts to solve this problem were attempted namely: hand held transmitters/receivers as well as remote unit transmitters/receivers. However, the problem was solved by the present invention because of an integration of a central monitoring computer in conjunction with signal dishes and a satellite.

Innovations within the prior art are rapidly being exploited in the field of child, animal and elderly person locating devices.

The present invention went contrary to the teaching of the art which teaches hand held transmitters/receivers as well as remote unit transmitters/receivers.

The present invention solved a long felt need for a global person or animal locating device.

The present invention produced unexpected results namely: theft of expensive animal such as horses can be quickly located as well as elderly persons with mental incapacitating diseases such as Alzheimer Disease whom are capable of traveling on rapid transport systems which quickly take a person out of a preset range.

A synergistic effect was produced utilizing the present invention due to the following facts and results from experimentation: elderly persons with mental incapacitating diseases such as Alzheimer Disease are taught not to travel away from repeated retrieval with the system as well as apprehending the thieves of expensive animals.

Accordingly, it is an object of the present invention to provide a location detector and monitor.

More particularly, it is an object of the present invention to provide a location detector and monitor which comprises a remote unit having a remote unit housing movably attached to a strap.

In keeping with these objects, and with others which will become apparent hereinafter, one feature of the present invention resides, briefly stated, in the remote unit housing containing a remote unit speaker/microphone, a power means, a remote unit transmitter, a remote unit computer chip, a remote unit keypad, and a remote unit receiver.

When the remote unit housing is designed in accordance with the present invention, a remote unit port is electronically connectable to a charger.

In accordance with another feature of the present invention, remote unit housing may have an optional remote unit cover.

Another feature of the present invention is that the strap comprises a left strap and a right strap.

Yet another feature of the present invention is that left strap has contained therein a left strap receiver antenna, a left safety strap, and a left strap transmitter antenna.

Still another feature of the present invention is that right strap has contained therein a right strap receiver antenna, a right safety strap, and a right strap transmitter antenna.

Yet still another feature of the present invention is that the location detector and monitor has a satellite communication system.

Still yet another feature of the present invention is that location detector and monitor has a tri-vector signal dish communication system.

Another feature of the present invention is that location detector and monitor has a central monitoring computer.

Yet another feature of the present invention is that the central monitoring computer has a central monitoring computer transmitter with an associated central monitoring computer transmitter antenna and a central monitoring computer receiver with an associated central monitoring computer receiver antenna.

Still another feature of the present invention is that the central monitoring computer has software capable of plotting a position utilizing Cartesian Coordinates Yet still another feature of the present invention is that the software is also capable of displaying an overlaying map.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING
PREFERRED EMBODIMENT

10—location detector and monitor (10)
12—remote unit (12)
12A—remote unit housing (12A)
12B—remote unit port (12B)
12C—remote unit cover (12C) (not shown)
12D—remote unit speaker/microphone (12D)

12E—power means (12E)
12F—remote unit transmitter (12F)
12G—remote unit computer chip (12G)
12H—remote unit keypad (12H)
12I—remote unit receiver (12F)
12L—remote unit left strap hinge (12L)
12R—remote unit right strap hinge (12R)
14—strap (14)
14L—left strap (14L)
14LA—left strap receiver antenna (14LA)
14LAA—left strap receiver antenna coupler (14LAA)
14LB—left safety strap (14LB)
14LBA—left safety strap coupler (14LBA)
14LC—left strap transmitter antenna (14LC)
14LCA—left strap transmitter antenna coupler (14LCA)
14R—right strap (14R)
14RA—right strap receiver antenna (14RA)
14RAA—right strap receiver antenna coupler (14RAA)
14RB—right safety strap (14RB)
14RBA—right safety strap coupler (14RBA)
14RC—right strap transmitter antenna (14RC)
14RCA—right strap transmitter antenna coupler (14RCA)
16—charger (16)
16A—charger wire (16A)
16B—charger plug (16B)
18—person (18)
18A—person's leg (18A)
18B—person's arm (18B)
20A—satellite (20A)
20AA—satellite microwave (20AA)
20B—satellite dish (20B)
20BA—satellite dish microwave (20BA)
22A—first signal dish (22A)
22AA—first signal dish radio wave (22AA)
22B—second signal dish (22B)
22BA—second signal dish radio wave (22BA)
22C—third signal dish (22C)
22CA—third signal dish radio wave (22CA)
22D—signal line (22D)
24—central monitoring computer (24)
24A—central monitoring computer signal line (24A)
24B—central monitoring computer satellite line (24B)
24C—central monitoring computer transmitter (24C) (not shown)
24CA—central monitoring computer transmitter antenna (24CA)
24D—central monitoring computer receiver (12D)
24DA—central monitoring computer receiver antenna (12DA)
26—map (26)
ZONE A—central monitoring computer zone (ZONE A)
ZONE B—remote unit zone (ZONE B)
ZONE C—non-overlap zone (ZONE C)
METHOD OF UTILIZING A LOCATION DETECTOR AND MONITOR(10)
210—method (210) of utilizing a location detector and monitor (10)
212—transmitting (212) a signal from central monitoring computer transmitter (24C) through a central monitoring computer transmitter antenna (24CA) forming a ZONE A
214—monitoring (214) ZONE C which is receiving a signal transmitted within ZONE B from a remote unit (12) by a central monitoring computer receiver (12D) through a central monitoring computer receiver antenna (12DA)
216—receiving (216) NO signal from a remote unit (12) in ZONE C
218—transmitting (218) an alarm signal through a central monitoring computer signal line (24A) to a first signal dish (22A) and a second signal dish (22B) and a third signal dish (22A)
220—transmitting (220) a first signal dish radio wave (22AA) from a first signal dish (22A) and second signal dish radio wave (22BA) from a second signal dish (22B) and a third signal dish radio wave (22CA) from a third signal dish (22A)
222—receiving (222) a first signal dish radio wave (22AA) from a first signal dish (22A) and second signal dish radio wave (22BA) from a second signal dish (22B) and a third signal dish radio wave (22CA) from a third signal dish (22A) by a remote unit receiver (12F) through a left strap receiver antenna (14LA) and a right strap receiver antenna (14RA)
224—transmitting (224) a position signal from a remote unit transmitter (12F) through a left strap transmitter antenna (14LC) and a right strap transmitter antenna (14RC)
226—receiving (226) the position signal by the first signal dish (22A) and a second signal dish (22B) and a third signal dish (22A)
228—receiving (228) vector coordinates by a central monitoring computer (24) from a first signal dish (22A) and a second signal dish (22B) and a third signal dish (22A)
230—analyzing (230) the received vector coordinates by the central monitoring computer (24)
232—plotting (232) a position of the remote unit (12) by the central monitoring computer (24)
234—transmitting (234) an alarm signal through a central monitoring computer satellite line (24B) to a satellite dish (20B)
236—transmitting (236) an alarm signal by a satellite dish microwave (20BA) from a satellite dish (20B) to a satellite (20A)
238—transmitting (238) an alarm signal by a satellite microwave (20AA) from the satellite (20A) toward the remote unit (12)
240—receiving (240) an alarm signal from the satellite (20A) by a remote unit receiver (12F) through a left strap receiver antenna (14LA) and a right strap receiver antenna (14RA)
242—transmitting (242) a position signal from a remote unit transmitter (12F) through a left strap transmitter antenna (14LC) and a right strap transmitter antenna (I4RC)
244—receiving (244) the position signal by the first signal dish (22A) and a second signal dish (22B) and a third signal dish (22A)
246—receiving (246) vector coordinates by a central monitoring computer (24) from a first signal dish (22A) and a second signal dish (22B) and a third signal dish (22A)
248—analyzing (248) the received vector coordinates by the central monitoring computer (24)
250—plotting (250) a position by the central monitoring computer (24) of the remote unit (12)
252—receiving (252) the position signal from the remote unit (12) by the satellite (20A)
254—receiving (254) vector coordinates by a central monitoring computer (24) from a microwave transmission by the satellite (20A) to the satellite dish (20B) through the central monitoring computer satellite line (24B)
256—analyzing (256) the received vector coordinates by the central monitoring computer (24)
258—plotting (258) a position by the central monitoring computer (24) of the remote unit (12)
260—breaking (260) an electronic link between a left safety strap (I4LB) and a right safety strap (14RB)

BRIEF DESCRIPTION OF THE DRAWING

FIG. 1 is a Perspective view of a person (18) and a central monitoring computer (24) at differing geographic positions on a map (26).

FIG. 1A is a perspective view of a person (18) having a remote unit (12) producing remote unit zone (ZONE B) attached thereon and a central monitoring computer (24) producing central monitoring computer zone (ZONE A).

FIG. 1A-1 is a list of zones consisting of a remote unit zone (ZONE B) produced by a remote unit (12), central monitoring computer zone (ZONE A) produced by a central monitoring computer (24), and non-overlap zone (ZONE C) representing an overlap or lack thereof between central monitoring computer zone (ZONE A) and remote unit zone (ZONE B).

FIG. 1B is a perspective view of a person (18) having a remote unit (12) producing remote unit zone (ZONE B) attached thereon and a central monitoring computer (24) plotting a position thereof by utilizing a satellite (20A) navigation system as well as Cartesian coordinates in a tri-vector system consisting of a first signal dish (22A), second signal dish (22B), and a third signal dish (22C).

FIG. 2 is a perspective view of a person (18) having a location detector and monitor (10) attached to the person's leg (18A).

FIG. 3 is a perspective view of a person (18) having a location detector and monitor (10) attached to the person's arm (18B).

FIG. 4 is a perspective view of a location detector and monitor (10) which comprises a remote unit (12) having a remote unit housing (12A) with a strap (14) attached thereto, the location detector and monitor (10) further comprises a charger (16) removably attachable thereto.

FIG. 5 is a perspective view of a central monitoring computer (24) linked to a satellite (20A) and a person (18) having a location detector and monitor (10).

DESCRIPTION OF THE PREFERRED EMBODIMENT

Figure 6:
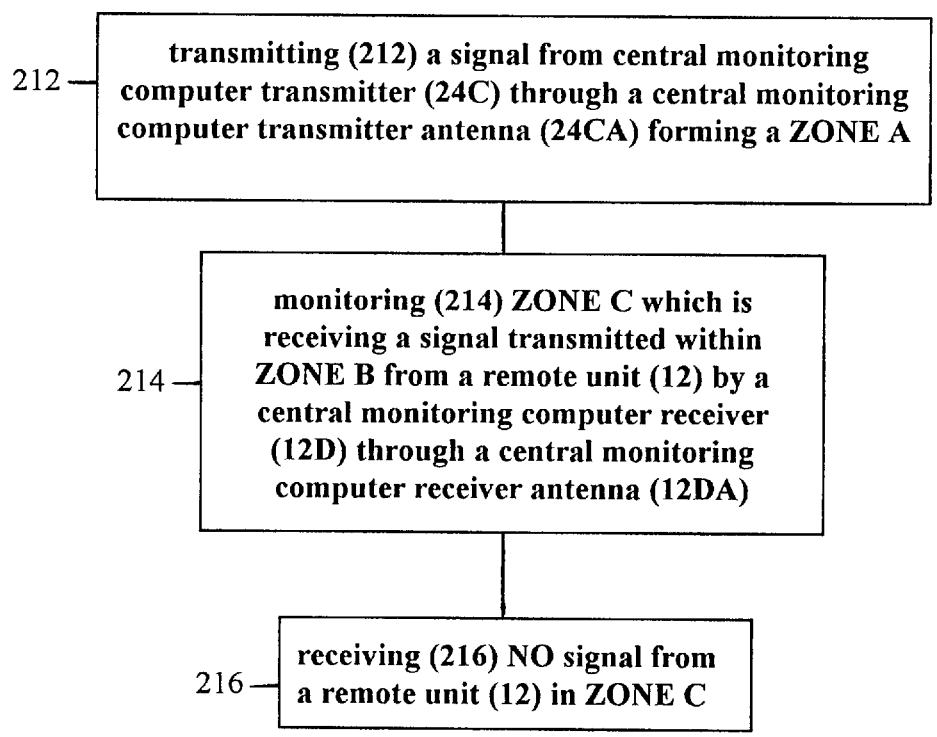
FIG. 6 is a diagrammatic representation of a method (210) of utilizing a location detector and monitor (10) and receiving (216) NO signal from a remote unit (12) in ZONE C comprising steps commencing with transmitting (212) a signal from central monitoring computer transmitter (24C) through a central monitoring computer transmitter antenna (24CA) forming a ZONE A.

Firstly, referring to FIG. 1 which is a perspective view of a person (18) and a central monitoring computer (24) at differing geographic positions on a map (26). The central monitoring computer (24) is capable of displaying an overlay of a map (26) wherein the person (18) having a location detector and monitor (10) attached thereon is located. The central monitoring computer (24) emanates a central monitoring computer zone (ZONE A) via a central monitoring computer transmitter (24C) (not shown) and a central monitoring computer transmitter antenna (24CA) (not shown). The location detector and monitor (10) emanates remote unit zone (ZONE B) via a signal via a remote unit transmitter (12F) in conjunction with a left strap receiver antenna (14LA) and right strap receiver antenna (14RA). The conjunction of the central monitoring computer zone (ZONE A) and the remote unit zone (ZONE B) produces an non-overlap zone (ZONE C).

Referring to FIGURE 1A and FIG. 1A-1 which are a perspective view of a person (18) having a remote unit (12) producing remote unit zone (ZONE B) attached thereon and a central monitoring computer (24) producing central monitoring computer zone (ZONE A) and a list of zones, respectively. An non-overlap zone (ZONE C) is produced by the conjunction of central monitoring computer zone (ZONE A) and remote unit zone (ZONE B). The distance of central monitoring computer zone (ZONE A) and remote unit zone (ZONE B) is preset and is variable depending on the intensity of the signal emanating from the central monitoring computer (24) and the remote unit (12). The less intense the signal, the shorter the distance of the zone. Thereby, a person's travel distance away from the central monitoring computer (24) is concurrently shortened.

FIG. 1B is a perspective view of a person (18) having a remote unit (12) producing remote unit zone (ZONE B) attached thereon and a central monitoring computer (24) plotting a position thereof by utilizing a satellite (20A) navigation system as well as Cartesian coordinates in a tri-vector system consisting of a first signal dish (22A), second signal dish (22B), and a third signal dish (22C). The central monitoring computer (24) sends a signal to the first signal dish (22A), the second signal dish (22B), and the third signal dish (22C) via a central monitoring computer signal line (24A) to a signal line (22D) which is preferably a telephone line. When receiving the signal, the first signal dish (22A) emanates a first signal dish radio wave (22AA). When receiving the signal, the second signal dish (22B) emanates a second signal dish radio wave (22BA). When receiving the signal, the third signal dish (22C) emanates a third signal dish radio wave (22CA). The first signal dish radio wave (22AA), second signal dish radio wave (22BA), and third signal dish radio wave (22CA) work in conjunction with one another to locate the remote unit (12), sending a signal thereto, which activates a remote unit transmitter (12F) sending a response signal from a left strap transmitter antenna (14LA) and a right strap transmitter antenna (14RA). The response signal is detected by the first signal dish (22A), the second signal dish (22B), and the third signal dish (22C) and transmitted back to a central monitoring computer receiver (12D) (not shown) via a central monitoring computer receiver antenna (12DA) of the central monitoring computer (24) via the signal line (22D). The central monitoring computer (24) utilizing Cartesian Coordinate plotting software can pinpoint the position of the remote unit (12). The Cartesian Coordinate plotting software functions to analyze the differences in time between the response signal received from the first signal dish (22A), the second signal dish (22B), and the third signal dish (22C) and thereby plots a position thereof.

Concurrently or in lieu thereof, the central monitoring computer (24) can transmit a signal from the central monitoring computer satellite line (24B) to the satellite dish (20B) which in turn transmits a satellite dish microwave (20BA) to the satellite (20A) which in turn transmits a satellite microwave (20AA) activating the remote unit transmitter (12F) sending a response signal from a left strap transmitter antenna (14LA) and a right strap transmitter antenna (14RA). The response signal is detected by the satellite (20A) which transmits the position signal of the location detector and monitor (10) to the satellite dish (20B) which in turn transmits the information to the central monitoring computer (24).

In addition to being able to plot the exact location of a person wearing a location detector and monitor (10), the system can monitor the distance a person travels away from a focal point such as the central monitoring computer (24). A travel zone can be established for a person (18) by presetting a distance of signal emanation from the central monitoring computer (24) as represented by central monitoring computer zone (ZONE A) and presetting a distance of signal emanation from the location detector and monitor (10) as represented by remote unit zone (ZONE B). When the remote unit zone (ZONE B) exceeds the non-overlap zone (ZONE C) as exhibited in FIG. 1A, a computer software program contained within the central monitoring computer (24) automatically sends a signal to the first signal dish (22A), the second signal dish (22B), and the third signal dish (22C) and/or send a signal to the satellite (20A) to commence the process of locating the position of the location detector and monitor (10) as previously described.

Referring to FIG. 2 and FIG. 3 which are a perspective view of a person (18) having a location detector and monitor (10) attached on a person's leg (18A) and/or person's arm (18B), respectively.

Now referring to FIG. 4 which is a perspective view of a location detector and monitor (10) which comprises a remote unit (12) having a remote unit housing (12A) with a strap (14) attached thereto, the location detector and monitor (10) further comprises a charger (16) removably attachable thereto. The remote unit (12) comprises a remote unit housing (12A) having a strap (14) electronically, integrally and securely attached thereto. The strap (14) comprises a left strap (1 4L) and a right strap (14R). The left strap (14L) consists of a left strap receiver antenna (14LA), a left safety strap (14LB), and a left strap transmitter antenna (14LC) integrally contained therein. The right strap (14R) consists of a right strap receiver antenna (14RA), a right safety strap (14RB), and a right strap transmitter antenna (14RC) integrally contained therein. The left strap receiver antenna (14LA) is electronically coupled to the right strap receiver antenna (14RA) by a left strap receiver antenna coupler (14LAA) and a right strap receiver antenna coupler (14RAA) forming a secure electronic clasp therebetween. The left safety strap (14LB) is electronically coupled to the right safety strap (14RB) by a left safety strap coupler (14LBA) and a right safety strap coupler (14RBA), respectively. The left safety strap coupler (14LBA) and the right safety strap coupler (14RBA) forming an electronic and secure connection therebetween. The left strap transmitter antenna (14LC) is electronically coupled to the right strap transmitter antenna (14RC) by a left strap transmitter antenna coupler (14LCA) and a right strap transmitter antenna coupler (14RCA), respectively, forming a secure electronic clasp therebetween.

The remote unit (12) comprises a remote unit housing (12A) having an optional remote unit cover (12C) (not shown). Within the remote unit housing (12A) is contained a remote unit port (12B) which is electronically connected to a power means (12E) and electronically coupled to an external charger (16) via a charger plug (16B) positioned at a distal end of a charger wire (16A). The remote unit housing (12A) further comprises a remote unit computer chip (12G) which controls and is electronically connected to the power means (12E), a remote unit speaker/microphone (12D), a remote unit keypad (12H), and a remote unit receiver (12F). The left strap (14L) and the right strap (14R) are attachable to the remote unit housing (12A) by a remote unit left strap hinge (12L) and a remote unit right strap hinge (12R), respectively. The remote unit transmitter (12F) is electronically coupled to the left strap transmitter antenna (14LC) and the right strap transmitter antenna (14RC). The remote unit receiver (12F) is electronically coupled to the left strap receiver antenna (14LA) and the right strap receiver antenna (14RA). The left safety strap (14LB) and the right safety strap (14RB) are electronically coupled to the remote unit computer chip (12G). A remote signal (as previously described) is automatically transmitted in response to an electronic break between the left safety strap (14LB) and the right safety strap (14RB) functioning as a safety alert if the location detector and monitor (10) is removed from the person (18) as exemplified in FIG. 5.

Referring to FIG. 6 which is a diagrammatic representation of a method (210) of utilizing a location detector and monitor (10) consisting of the following steps:

A) transmitting (212) a signal from central monitoring computer transmitter (24C) through a central monitoring computer transmitter antenna (24CA) forming a ZONE A;

B) monitoring (214) ZONE C which is receiving a signal transmitted within ZONE B from a remote unit (12) by a central monitoring computer receiver (12D) through a central monitoring computer receiver antenna (12DA); and C) receiving (216) NO signal from a remote unit (12) in ZONE C.

Figure 7:
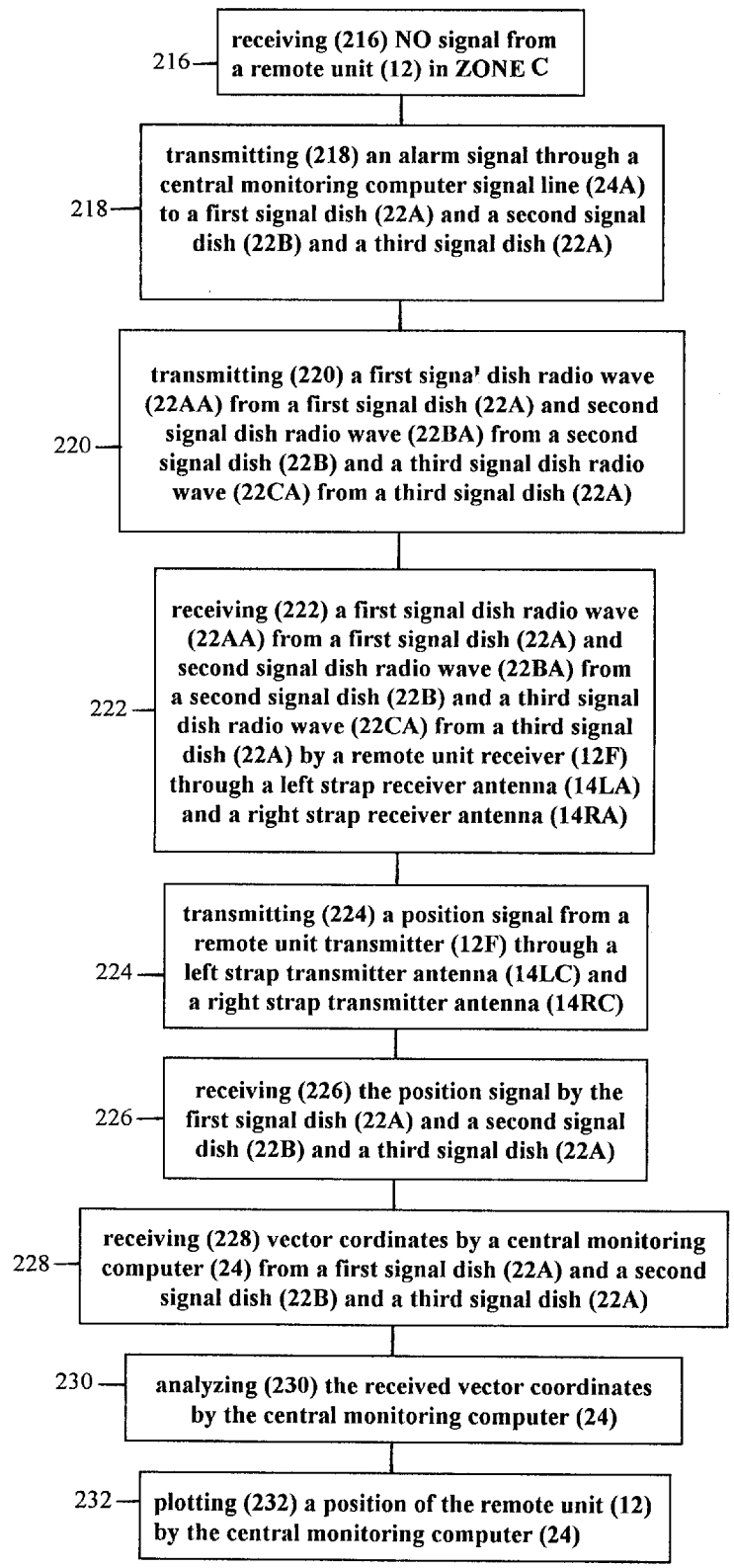
FIG. 7 is a diagrammatic representation of a method (210) of utilizing a location detector and monitor (10) and plotting (232) a position of the remote unit (12) by the central monitoring computer (24) comprising steps commencing with receiving (216) NO signal from a remote unit (12) in ZONE C.

Referring to FIG. 7 which is a diagrammatic representation of a method (210) of utilizing a location detector and monitor (10) consisting of the following steps:

A) receiving (216) NO signal from a remote unit (12) in ZONE C;

B) transmitting (218) an alarm signal through a central monitoring computer signal line (24A) to a first signal dish (22A) and a second signal dish (22B) and a third signal dish (22A);

C) transmitting (220) a first signal dish radio wave (22AA) from a first signal dish (22A) and second signal dish radio wave (22BA) from a second signal dish (22B) and a third signal dish radio wave (22CA) from a third signal dish (22A);

D) receiving (222) a first signal dish radio wave (22AA) from a first signal dish (22A) and second signal dish radio wave (22BA) from a second signal dish (22B) and a third signal dish radio wave (22CA) from a third signal dish (22A) by a remote unit receiver (12F)

through a left strap receiver antenna (14LA) and a right strap receiver antenna (14RA);

E) transmitting (224) a position signal from a remote unit transmitter (12F) through a left strap transmitter antenna (14LC) and a right strap transmitter antenna (14RC)

F) receiving (226) the position signal by the first signal dish (22A) and a second signal dish (22B) and a third signal dish (22A);

G) receiving (228) vector coordinates by a central monitoring computer (24) from a first signal dish (22A) and a second signal dish (22B) and a third signal dish (22A);

H) analyzing (230) the received vector coordinates by the central monitoring computer (24); and I) plotting (232) a position of the remote unit (12) by the central monitoring computer (24).

Figure 8:
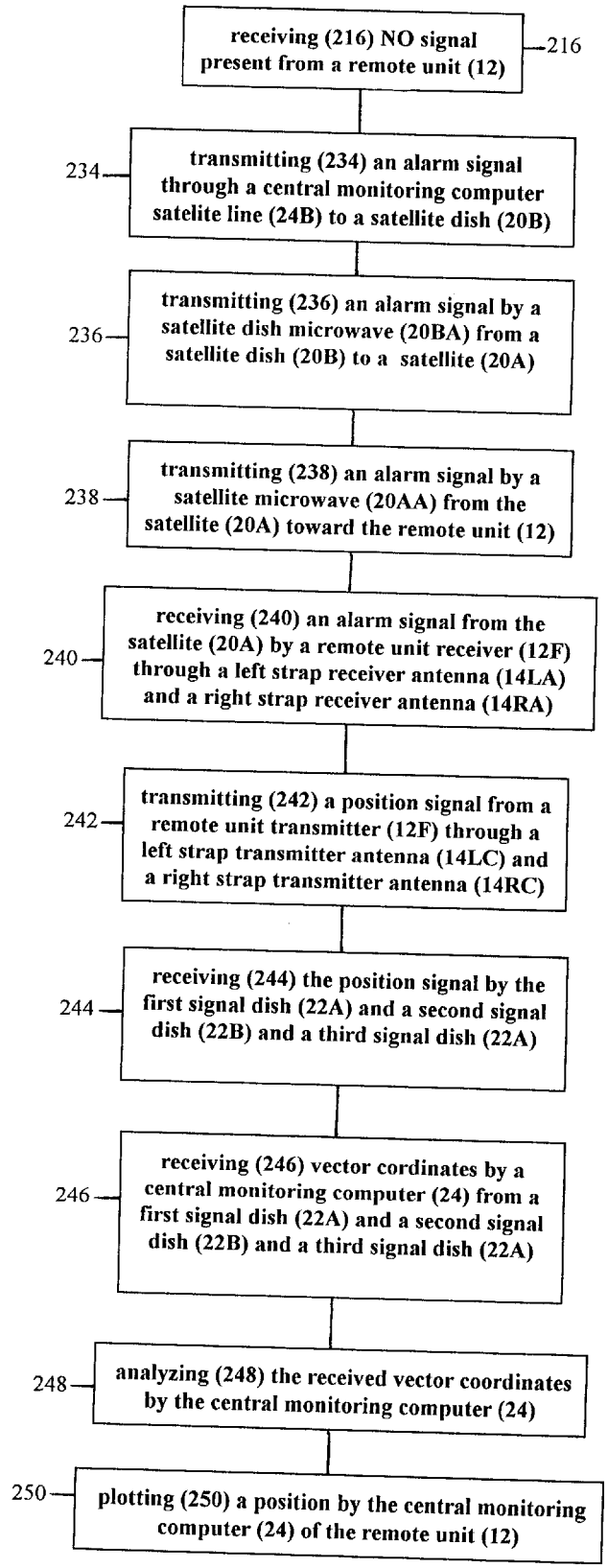
FIG. 8 is a diagrammatic representation of a method (210) of utilizing a location detector and monitor (10) and plotting (250) a position by the central monitoring computer (24) of the remote unit (12) comprising steps commencing with receiving (216) NO signal from a remote unit (12) in ZONE C.

Referring to FIG. 8 which is a diagrammatic representation of a method (210) of utilizing a location detector and monitor (10) consisting of the following steps:

A) receiving (216) NO signal from a remote unit (12) in ZONE C;

B) transmitting (234) an alarm signal through a central monitoring computer satellite line (24B) to a satellite dish (20B);

C) transmitting (236) an alarm signal by a satellite dish microwave (20BA) from a satellite dish (20B) to a satellite (20A);

D) transmitting (238) an alarm signal by a satellite microwave (20AA) from the satellite (20A) toward the remote unit (12);

E) receiving (240) an alarm signal from the satellite (20A) by a remote unit receiver (12F) through a left strap receiver antenna (14LA) and a right strap receiver antenna (14RA);

F) transmitting (242) a position signal from a remote unit transmitter (12F) through a left strap transmitter antenna (14LC) and a right strap transmitter antenna (14RC);

G) receiving (244) the position signal by the first signal dish (22A) and a second signal dish (22B) and a third signal dish (22A);

H) receiving (246) vector coordinates by a central monitoring computer (24) from a first signal dish (22A) and a second signal dish (22B) and a third signal dish (22A);

I) analyzing (248) the received vector coordinates by the central monitoring computer (24); and J) plotting (250) a position by the central monitoring computer (24) of the remote unit (12).

Figure 9:
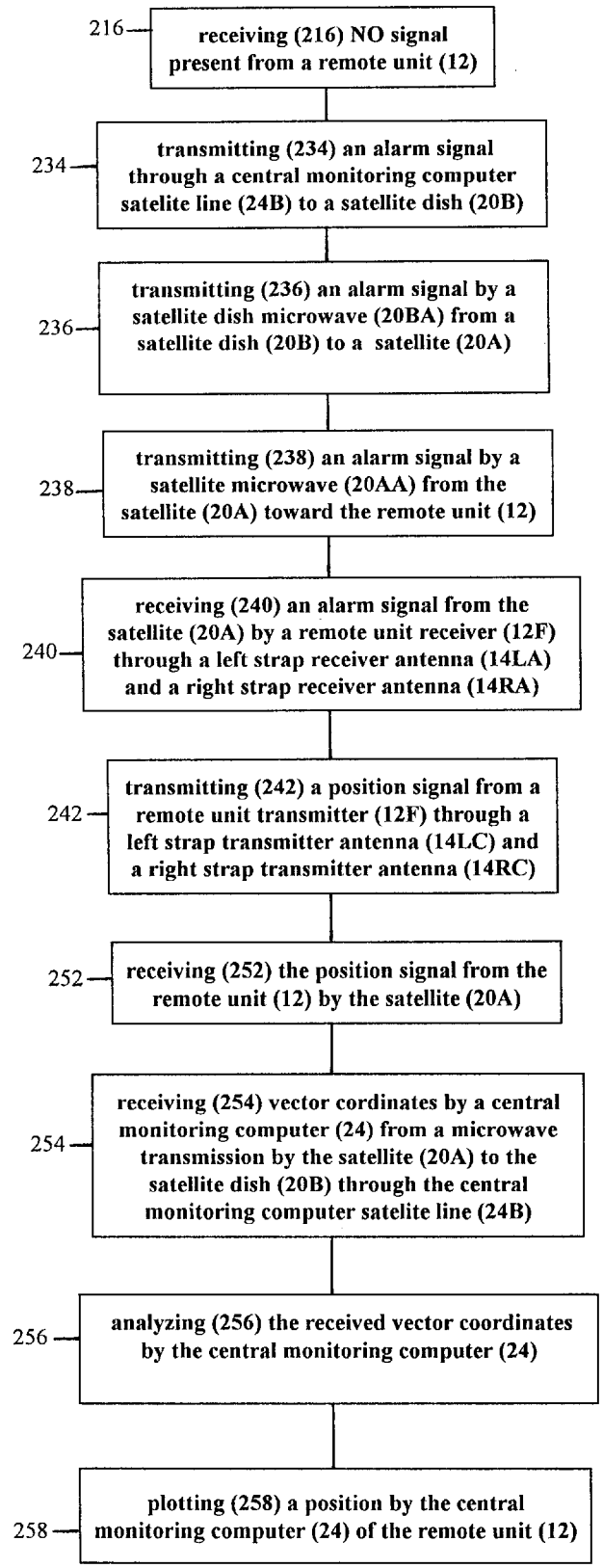
FIG. 9 is a diagrammatic representation of a method (210) of utilizing a location detector and monitor (10) and plotting (258) a position by the central monitoring computer (24) of the remote unit (12) comprising steps commencing with receiving (216) NO signal from a remote unit (12) in ZONE C.

Referring to FIG. 9 which is a diagrammatic representation of a method (210) of utilizing a location detector and monitor (10) consisting of the following steps:

A) receiving (216) NO signal from a remote unit (12) in ZONE C;

B) transmitting (234) an alarm signal through a central monitoring computer satellite line (24B) to a satellite dish (20B);

C) transmitting (236) an alarm signal by a satellite dish microwave (20BA) from a satellite dish (20B) to a satellite (20A);

D) transmitting (238) an alarm signal by a satellite microwave (20AA) from the satellite (20A) toward the remote unit (12);

E) receiving (240) an alarm signal from the satellite (20A) by a remote unit receiver (12F) through a left strap receiver antenna (14LA) and a right strap receiver antenna (14RA);

F) transmitting (242) a position signal from a remote unit transmitter (12F) through a left strap transmitter antenna (14LC) and a right strap transmitter 16 antenna (14RC);

G) receiving (244) the position signal by the first signal dish (22A) and a second signal dish (22B) and a third signal dish (22A);

H) receiving (246) vector coordinates by a central monitoring computer (24) from a first signal dish (22A) and a second signal dish (22B) and a third signal dish (22A);

I) analyzing (248) the received vector coordinates by the central monitoring computer (24);

J) receiving (252) the position signal from the remote unit (12) by the satellite (20A);

K) receiving (254) vector coordinates by a central monitoring computer (24) from a microwave transmission by the satellite (20A) to the satellite dish (20B) through the central monitoring computer satellite line (24B);

L) analyzing (256) the received vector coordinates by the central monitoring computer (24); and K) plotting (258) a position by the central monitoring computer (24) of the remote unit (12).

Figure 10:
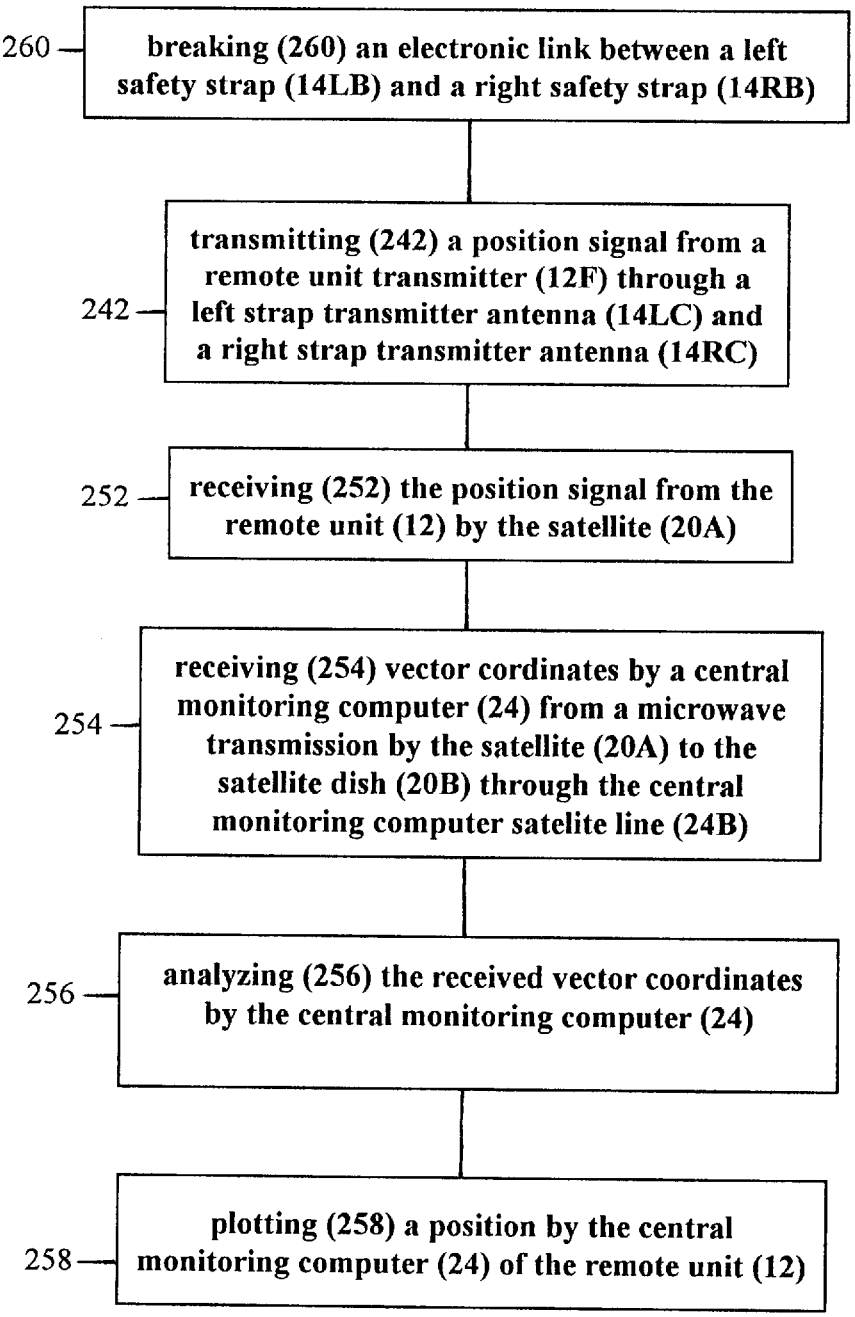
FIG. 10 is a diagrammatic representation of a method (210) of utilizing a location detector and monitor (10) and plotting (258) a position by the central monitoring computer (24) of the remote unit (12) comprising steps commencing with breaking (260) an electronic link between a left safety strap (14LB) and a right safety strap (14RB).

Referring to FIG. 10 which is a diagrammatic representation of a method (210) of utilizing a location detector and monitor (10) consisting of the following steps:

A) breaking (260) an electronic link between a left safety strap (14LB) and a right safety strap (14RB);

B) transmitting (242) a position signal from a remote unit transmitter (12F) through a left strap transmitter antenna (14LC) and a right strap transmitter antenna (14RC);

C) receiving (252) the position signal from the remote unit (12) by the satellite (20A);

D) receiving (254) vector coordinates by a central monitoring computer (24) from a microwave transmission by the satellite (20A) to the satellite dish (20B) through the central monitoring computer satellite line (24B);

E) analyzing (256) the received vector coordinates by the central monitoring computer (24); and F) plotting (258) a position by the central monitoring computer (24) of the remote unit (12).

Figure 11:
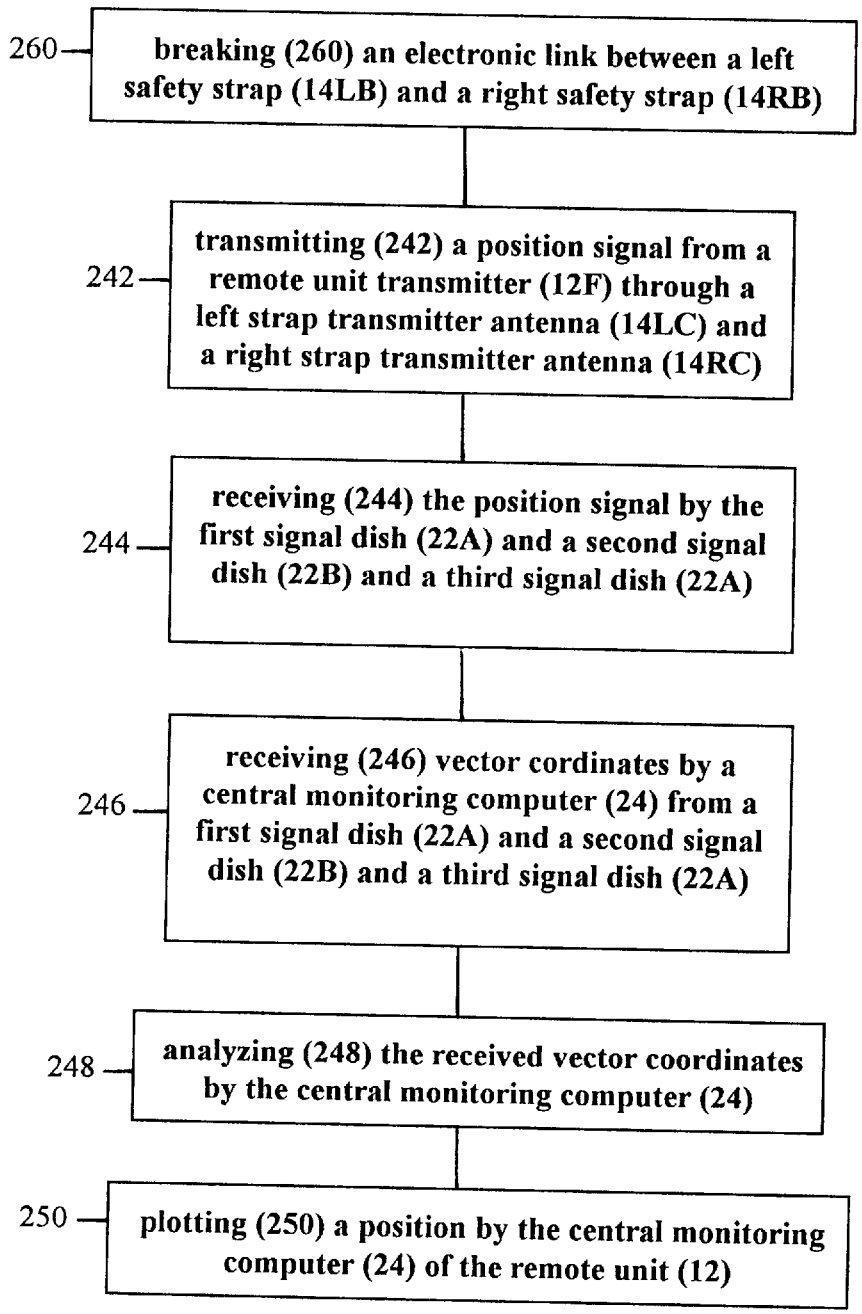
FIG. 11 is a diagrammatic representation of a method (210) of utilizing a location detector and monitor (10) and plotting (250) a position by the central monitoring computer (24) of the remote unit (12) comprising steps commencing with breaking (260) an electronic link between a left safety strap (14LB) and a right safety strap (14RB).

Lastly, referring to FIG. 11 which is a diagrammatic representation of a method (210) of utilizing a location detector and monitor (10) consisting of the following steps:

A) breaking (260) an electronic link between a left safety strap (1 4LB) and a right safety strap (14RB);

B) transmitting (242) a position signal from a remote unit transmitter (12F) through a left strap transmitter antenna (14LC) and a right strap transmitter antenna (14RC);

C) receiving (244) the position signal by the first signal dish (22A) and a second signal dish (22B) and a third signal dish (22A);

D) receiving (246) vector coordinates by a central monitoring computer (24) from a first signal dish (22A) and a second signal dish (22B) and a third signal dish (22A);

E) analyzing (248) the received vector coordinates by the central monitoring computer (24); and F) plotting (250) a position by the central monitoring computer (24) of the remote unit (12).

It will be understood that each of the elements described above, or two or more together, may also find a useful application in other types of constructions differing from the type described above.

While the invention has been illustrated and described as embodied in a location detector and monitor (10) and method of using the same, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A location system comprising a location detector and monitor (10) removably attachable to a person (18) and a central monitoring computer (24) electronically and signal communicatively coupled to:

a central monitoring computer signal line (24A);

a central monitoring computer satellite line (24B);

a central monitoring computer transmitter (24C) which is coupled to a central monitoring computer transmitter antenna (24CA);

a central monitoring computer receiver (12D) which is coupled to a central monitoring computer receiver antenna (12DA);

a first signal dish (22A), a second signal dish (22B), and a third signal dish (22C), through said central monitoring computer signal line;

a satellite dish (20B), which is capable of producing and capturing a satellite dish microwave (20BA), through said central monitoring computer satellite line;

a satellite (20A), which is capable of producing a satellite microwave (20AA);

the central monitoring computer (24) further comprises software functioning to plot a location utilizing Cartesian Coordinates generated from a first signal dish radio wave (22AA) emanating from the first signal dish (22A), a second signal dish radio wave (22BA) emanating from the second signal dish (22B) and a third signal dish radio wave (22CA) emanating from the third signal dish (22C); the location detector and monitor (10) further comprises:

A) remote unit (12) which comprises:
      i) a remote housing (12A),
      ii) a power means (12E) contained within the remote unit housing (12A),
      iii) a remote unit computer chip (12G) electronically connected to the power means (12E),
      iv) a remote unit speaker/microphone (12D) electronically connected to the remote unit computer chip (12G),
      v) a remote unit transmitter (12F) electronically connected to the remote unit computer chip (12G),
      vi) a remote unit keypad (12H) electronically connected to the remote unit computer chip (12G),
      vii) a remote unit receiver (12F) electronically connected to the remote unit chip (12G),
      viii) a remote unit left strap hinge (12L) securely attached to the remote unit housing (12A), and
      ix) a remote unit right strap hinge (12R) securely attached to the remote unit housing (12A);

B) a strap (14) which comprises a left strap (14L) movably attached to the left strap hinge (12L) and a right strap (14R) movably attached to a remote unit right strap hinge (12R), the left strap (14L) comprises a left strap receiver antenna (14LA) electronically connected to the remote unit receiver (12F), the left strap (14L) further comprises a left safety strap (14LB) electronically connected to the remote unit computer chip (12G), the left strap (14L) further comprises a left strap transmitter antenna (14LC) electronically connected to the remote unit transmitter (12F), the right strap (14R) comprises a right strap receiver antenna (14RA) electronically connected to the remote unit receiver (12F), the right strap (14R) further comprises a right safety strap (14RB) electronically connected to the remote unit computer chip (12G), the right strap (14R) further comprises a right strap transmitter antenna (14RC) electronically connected to the remote unit transmitter (12F), the left strap receiver antenna (14LA) is securely and electronically coupled to the right strap receiver antenna (14RA) by a left strap receiver antenna coupler (14LAA) and a right strap receiver antenna coupler (14RAA), the left safety strap (14LB) is securely and electronically coupled to the right safety strap (14RB) by a left safety strap coupler (14LBA) and a right safety strap coupler (14RBA), the left strap transmitter antenna (14LC) is securely and electronically coupled to the right strap transmitter antenna (14RC) by a left strap transmitter antenna coupler (14LCA) and a right strap transmitter antenna coupler (14RCA).

2. The location system as described in claim 1, wherein the remote unit (12) further comprises a remote unit cover (12C).

3. The location system as described in claim 1, wherein the remote unit (12) further comprises a remote unit port (12B) electronically connected to the power means (12E), the remote unit port (12B) is electronically removably attachable to a charger plug (16B) electronically connected to and positioned at a distal end of a charger wire (16A) which is electronically connected to a charger (16).

4. The location system as described in claim 1, wherein the strap (14) is attachable to a person's leg (18A).

5. The location system as described in claim 1, wherein the strap (14) is attachable to a person's arm (18B).

6. The location system as described in claim 1, wherein the software of the central monitoring computer (24) is capable of generating a map (26) as an overlay for displaying a position of the remote unit (12).

7. The location system as described in claim 1, wherein the remote unit (12) is capable of generating a remote unit zone (ZONE B) by transmitting a signal from the remote unit transmitter (12F) via the left strap transmitter antenna (14LC) and the right strap transmitter antenna (14RC).

8. The location system as described in claim 7, wherein the remote unit (12) is capable of receiving the satellite microwave (20AA) signal from the satellite (20A) and receiving the first signal dish radio wave (22AA) signal from the first signal dish (22A) and receiving the second signal dish radio wave (22BA) signal from the second signal dish (22B) and receiving the third signal dish radio wave (22CA) from the third signal dish (22C).

* * * * *